United States Patent
Bisti et al.

(10) Patent No.: US 9,769,708 B2
(45) Date of Patent: Sep. 19, 2017

(54) METHOD AND SYSTEM FOR MOBILITY MANAGEMENT IN LABEL SWITCHED NETWORKS

(71) Applicant: FLUIDMESH NETWORKS S.R.L., Milan (IT)

(72) Inventors: Luca Bisti, Milan (IT); Lorenzo Bianconi, Milan (IT); Alessandro Erta, Milan (IT); Umberto Malesci, Milan (IT)

(73) Assignee: FLUIDMESH NETWORKS S.R.L., Milan (IT)

( * ) Notice: Subject to any disclaimer, the term of this patent is extended or adjusted under 35 U.S.C. 154(b) by 171 days.

(21) Appl. No.: 14/427,251

(22) PCT Filed: Sep. 10, 2013

(86) PCT No.: PCT/EP2013/068761
§ 371 (c)(1),
(2) Date: Mar. 10, 2015

(87) PCT Pub. No.: WO2014/041002
PCT Pub. Date: Mar. 20, 2014

(65) Prior Publication Data
US 2015/0223118 A1 Aug. 6, 2015

(30) Foreign Application Priority Data
Sep. 14, 2012 (EP) .................................. 12184561

(51) Int. Cl.
*H04W 36/00* (2009.01)
*H04W 40/36* (2009.01)
(Continued)

(52) U.S. Cl.
CPC ......... *H04W 36/0016* (2013.01); *H04L 45/04* (2013.01); *H04L 45/22* (2013.01);
(Continued)

(58) Field of Classification Search
None
See application file for complete search history.

(56) References Cited

U.S. PATENT DOCUMENTS 8,081,611 B2    12/2011  Berzin et al.
8,422,514 B1 *   4/2013  Kothari ............... H04L 12/4633
                                                        370/351
(Continued)

OTHER PUBLICATIONS

European Patent Office, International Search Report issued Oct. 15, 2013 in corresponding PCT Application No. PCT/EP2013/068761, filed Sep. 10, 2013.
(Continued)

*Primary Examiner* — Mohammad Adhami
*Assistant Examiner* — Vladislav Agureyev
(74) *Attorney, Agent, or Firm* — Patzik, Frank & Samotny Ltd.

(57) ABSTRACT

A method of mobility management in a label-switched network comprising a primary domain comprising N label-switched nodes, with N>1, and a mobile domain comprising M mobile label-switched nodes, with M≥1, the mobile domain being movable with respect to said primary domain, packets routing between the primary domain and the mobile domain being performed by means of a primary border node, selected from the N label-switched nodes, and a mobile border node, selected from the M mobile label-switched nodes, wherein a handoff procedure is executed that establishes a label switched connection between the primary border node and the mobile border node.

19 Claims, 7 Drawing Sheets

(51) Int. Cl.
  *H04L 12/715* (2013.01)
  *H04L 12/707* (2013.01)
  *H04L 12/723* (2013.01)

(52) U.S. Cl.
  CPC ......... *H04L 45/50* (2013.01); *H04W 36/0055* (2013.01); *H04W 40/36* (2013.01)

(56) References Cited

U.S. PATENT DOCUMENTS

| | | | | |
|---|---|---|---|---|
| 8,451,837 | B1* | 5/2013 | Schuett | H04L 45/46 370/390 |
| 8,611,359 | B1* | 12/2013 | Kompella | H04L 45/04 370/401 |
| 8,737,394 | B2* | 5/2014 | Dong | H04L 45/04 370/389 |
| 2006/0209716 | A1* | 9/2006 | Previdi | H04L 12/5695 370/254 |
| 2006/0262735 | A1* | 11/2006 | Guichard | H04L 12/66 370/254 |
| 2007/0058568 | A1* | 3/2007 | Previdi | H04L 45/50 370/254 |
| 2007/0133406 | A1* | 6/2007 | Vasseur | H04L 45/02 370/230 |
| 2009/0016334 | A1* | 1/2009 | Forsberg | H04W 28/06 370/389 |
| 2009/0022115 | A1* | 1/2009 | Berzin | H04W 40/24 370/338 |
| 2009/0041023 | A1* | 2/2009 | Ould Brahim | H04L 12/66 370/395.3 |
| 2010/0080169 | A1* | 4/2010 | Berzin | H04L 45/50 370/328 |
| 2010/0080190 | A1* | 4/2010 | Berzin | H04L 45/50 370/331 |
| 2010/0124231 | A1* | 5/2010 | Kompella | H04L 45/04 370/401 |
| 2010/0177674 | A1* | 7/2010 | Aggarwal | H04L 45/02 370/312 |
| 2010/0246545 | A1* | 9/2010 | Berzin | H04L 12/4641 370/338 |
| 2011/0317703 | A1* | 12/2011 | Dunbar | H04L 12/462 370/392 |
| 2012/0069847 | A1* | 3/2012 | Saad | H04L 45/02 370/392 |
| 2012/0099538 | A1* | 4/2012 | Venkataswami | H04W 76/022 370/329 |
| 2012/0314659 | A1* | 12/2012 | Schatzmayr | H04W 76/022 370/328 |
| 2013/0031271 | A1* | 1/2013 | Bosch | H04W 40/36 709/245 |
| 2014/0177637 | A1* | 6/2014 | Duncan | H04L 45/507 370/395.5 |

OTHER PUBLICATIONS

Berzin et al., "Mobility label based network: Hierarchical mobility management and packet forwarding architecture", Computer Networks, Elsevier Science Publishers B.V., Amsterdam, NL, vol. 53, No. 12, Aug. 13, 2009.

Zhao, et al., "Protection Mechanisms for Label Distribution Protocol P2MP/MP2MP Label Switched Paths", Internet Engineering Task Force (IETF), Standard Working Draft, Internet Society (ISOC), 4 rue des Falaises, CH-1205, Geneva, Mar. 13, 2012.

Berzin, et al., "Mobility Support Using MPLS and MP-BGP Signaling", Internet Engineering Task Force (IETF), Standard Working Draft, Internet Society (ISOC), 4 rue des Falaises, CH-1205, Geneva, Apr. 28, 2008.

\* cited by examiner

METHOD AND SYSTEM FOR MOBILITY MANAGEMENT IN LABEL SWITCHED NETWORKS

CROSS REFERENCE TO RELATED APPLICATIONS

This application is a U.S. national phase application, filed pursuant to 35 U.S.C. §371, of International Application No. PCT/EP2013/068761, filed Sep. 10, 2013, the entirety of which is hereby incorporated by reference, which claims priority to European Patent Application No. 12184561.4, filed Sep. 14, 2012, the entirety of which is hereby incorporated by reference.

BACKGROUND OF THE INVENTION

1. Field of the Invention

The present invention relates to a method and system for mobility management in label switched networks.

2. General Background of the Invention

Label switched networks are networks wherein data packets are forwarded on the basis of labels.

A practical implementation of label switching could be based on MultiProtocol Label Switching (MPLS), which is an Internet Engineering Task Force (IETF) standardized protocol.

According to MPLS, data packets entering the network at one node, called ingress, are classified into a Forwarding Equivalence Class (FEC). All data packets with a same FEC follow a same primary path (called Label Switched Path or LSP) to a destination node, called egress. The nodes of the network, including intermediate ones, take per-packet forwarding decisions based on label Forwarding Information Base (FIB) tables.

BRIEF SUMMARY OF THE INVENTION

The present invention can be advantageously used in label switched wireless mesh networks.

A wireless mesh network (WMN) is a communication network made up of nodes organized in a mesh topology. The nodes can communicate with each other over wireless and wired links. Wireless mesh networks typically comprise mesh clients, mesh routers and optionally gateways. The mesh clients are often laptops, cell phones and other wireless devices while the mesh routers forward traffic to and from the nodes (mesh clients and mesh routers) in the network including, if any, the gateways which may but need not connect to the Internet. The mesh routers forward packets in a multi-hop manner to reach the intended destination within the WMN. Wireless mesh networks can be implemented with various wireless technology including 802.11, 802.15, 802.16 IEEE standards, cellular technologies or combinations of more than one type.

Mobility management in label switched networks enables maintenance of a communication session between a mobile node and another node of the network when the mobile node moves within the network.

U.S. Pat. No. 8,081,611 discloses a mobility label-based network wherein a device receives a discovery signal from a mobile node, registers the mobile node in response to receiving the discovery signal from the mobile node, assigns a mobility label to the mobile node after the registration, distributes messages describing the mobility label and the mobile node to edge nodes in the network to create a label switched path, and routes communication messages from a remote node to the mobile node along the label switched path in the network. The device can be a label edge node of an IP/MPLS network. The device registers the mobile node in response to the discovery signal by sending a virtual IP address to the mobile node, which in turn responds with registration information comprising the mobile node IP address.

The Applicant observes that the technique described by U.S. Pat. No. 8,081,611 may be disadvantageous in terms of signaling and information spreading, bandwidth usage and employment of node resources (e.g. memory usage, processing, number of FIB table entries and number of updating operations on FIB tables).

Indeed, the Applicant observes that in the network described by U.S. Pat. No. 8,081,611, each label edge node has to assign a mobility label and to create a label switched path for each mobile node that accesses the network through such label edge node. In addition, packet communications between the mobile node and the label edge node are established by means of an IP connection.

It is an object of the invention to provide an alternative technique for mobility management in a label switched network.

It is a further object of the invention to provide a technique for mobility management in a label switched network that enables to reduce signaling and information spreading through the network, bandwidth usage and employment of node resources (that is, memory usage, processing, number of FIB table entries, number of updating operations on FIB tables, and similar).

It is another object of the invention to provide a technique for mobility management in a label switched network which is able to react very quickly (e.g. with latency in the order of few milliseconds) to changes of the network topology due to nodes mobility, and to possibly eliminate (or significantly reduce) any loss of data packets during the process of mobility management and reconfiguration of the network.

The Applicant found that the above objects are achieved by a method of mobility management in a label-switched network comprising a primary domain comprising N label-switched nodes, with N>1, and a mobile domain comprising M mobile label-switched nodes, with M≥1, the mobile domain being movable with respect to said primary domain, packets routing between the primary domain and the mobile domain being performed by means of a primary border node, selected from the N label-switched nodes, and a mobile border node, selected from the M mobile label-switched nodes, wherein a handoff procedure is executed, establishing a label switched connection between the primary border node and the mobile border node, wherein:

the mobile border node sends a request message to the primary border node, the request message comprising M' labels adapted to enable the primary border node to form label switched paths from the primary border node to M' of the M mobile label-switched nodes, via the mobile border node, with M' integer, 1≤M'≤M;

at the receipt of said request message, the primary border node sends a response message to the mobile border node, the response message comprising N' labels adapted to enable the mobile border node to form label switched paths from the mobile border node to N' of the N label-switched nodes, via the primary border node, with N' integer, 1<N'≤N; at the receipt of said request message, the primary border node also sending a notify message comprising M' stacking labels, allocated to the M' mobile label-switched nodes, to at least part of said N' label-switched nodes;

wherein, when M>1, at the receipt of said response message, the mobile border node sends a notify message comprising N' stacking labels, allocated to said N' label-switched nodes, to at least part of the M' mobile label-switched nodes.

In a second aspect, the present invention relates to a label switched network comprising a primary domain comprising N label-switched nodes, with N>1, and a mobile domain comprising M mobile label-switched nodes, with M≥1, the mobile domain being movable with respect to said primary domain, packets routing between the primary domain and the mobile domain being performed by means of a primary border node, selected from the N label-switched nodes, and a mobile border node, selected from the M mobile label-switched nodes, wherein the N label-switched nodes and the M mobile label-switched nodes are configured so as to carry out the method according to the first aspect of the invention.

According to the claimed invention, packet routing between the primary border node and the mobile border node is performed by means of label-switched paths. In a mobility scenario, this enables to simplify the reconfiguration of the network, without disrupting its service, by limiting the signaling and information spreading through the network, the bandwidth usage and the employment of node resources and, thus, to react very quickly (e.g. with latency in the order of few milliseconds) to changes of the network topology due to nodes mobility. IP addresses need not to be exchanged between label-switched nodes and client devices of the mobile domain and label-switched nodes of the primary domain. Nodes and client devices of the mobile domain can thus maintain the same IP address during mobility, preserving data packets connections intact.

According to the claimed invention, packet routing between the primary domain and the mobile domain is performed via the intermediation of the mobile border node and the primary border node. Mobility management is thus advantageously handled by only one node (the mobile border node) of the mobile domain and only one node (the primary border node) of the primary domain. In this way, pre-existing intra-mobile-domain label-switched paths and intra-primary-domain label-switched paths, respectively predefined within the mobile domain and within the primary domain, are not involved in the mobility management and remain unchanged. This advantageously enables to further reduce the signaling and information spreading through the network, the bandwidth usage and the employment of node resources.

According to the claimed invention, mobility of a plurality of client devices belonging to a mobile domain can be handled by a single label-switched node (the mobile border node). The plurality of client devices are not involved at all in the mobility management. This contributes to further limit the signaling and information spreading through the network, the bandwidth usage and the employment of node resources. In addition, the use of a single mobile border node to handle mobility of a plurality of client devices can be advantageous considering that client devices are often more limited in terms of resources compared to label-switched nodes.

In the present description and claims, the term "node" is used to indicate a router or any other device (such as a PC, a mobile phone, a PDA and similar) configured so as to carry out the method of mobility management according to the invention.

In the present description and claims, the expression "label-switched node" is used to indicate a node configured to route packets through label switching (e.g., via MPLS).

In the present description and claims, the expression "client device" is used to indicate a device (such as a PC, a mobile phone, a PDA, a video camera and similar) which may be connected directly or indirectly to a label-switched node but which is not active in carrying out the method of mobility management according to the invention. The mobility management is performed in a seamless way with respect to client devices.

In the present description and claims, the expression "primary domain" indicates a pivot domain used as a reference domain for the mobility of one or more mobile domains. The expression "primary domain" includes the case of a primary domain which is movable itself.

The dependent claims refer to particularly advantageous embodiments of the invention.

The present invention in at least one of the aforementioned aspects can have at least one of the following preferred characteristics.

Advantageously, said M' mobile label-switched nodes include the mobile border node. In a preferred embodiment, when M>1 and M'>1, the mobile border node sends the notify message comprising said N' stacking labels to the other M'−1 mobile label-switched nodes (the M' mobile label-switched nodes less the mobile border node).

Advantageously, said N' label-switched nodes include the primary border node. In a preferred embodiment, the primary border node sends a notify message comprising said M' stacking labels to N'−1 label-switched nodes (the N' label-switched nodes less the primary border node).

Suitably, when M=1, said notify message comprising said N' stacking labels is not sent by the mobile border node.

Advantageously, intra-primary-domain labels are used for routing data packets between the N label-switched nodes of the primary domain through intra-primary-domain label-switched paths. Said intra-primary-domain labels are advantageously configured into suitable forwarding information storage areas of the N label-switched nodes. Said configuration is preferably performed by using standard signaling protocols for LSP establishment and management.

Advantageously, when M>1, intra-mobile-domain labels are used for routing data packets between the M mobile label-switched nodes of the mobile domain through intra-mobile-domain label-switched paths. Said intra-mobile-domain labels are advantageously configured into suitable forwarding information storage areas of the M mobile label-switched nodes. Said configuration is preferably performed by using standard signaling protocols for LSP establishment and management.

Advantageously, at the receipt of the notify message, said at least part of the N' label-switched nodes updates a respective forwarding information storage area with said M' stacking labels. At each of said at least part of the N' label-switched nodes, said M' stacking labels are associated with a intra-primary-domain label, said intra-primary-domain label being used by such label-switched node to route packets to the primary border node through a intra-primary-domain label-switched path.

Advantageously, at the receipt of the notify message, said at least part of the M' mobile label-switched nodes updates a respective forwarding information storage area with said N' stacking labels. At each of said at least part of the M' mobile label-switched nodes, said N' stacking labels are associated with a intra-mobile-domain label, said intra-mobile-domain label being used by such mobile label-switched node to route packets to the mobile border node through a intra-mobile-domain label-switched path.

Advantageously, after receiving the notify message, said at least part of the N' label-switched nodes uses said M' stacking labels for routing packets (via label switching) to the M' mobile label-switched nodes, via the primary border node and the mobile border node. Preferably, after receiving the notify message, said at least part of the N' label-switched nodes uses said intra-primary-domain labels stacked with said M' stacking labels for routing packets to the M' mobile label-switched nodes, via the primary border node and the mobile border node.

Advantageously, after receiving the notify message, said at least part of the M' mobile label-switched nodes uses said N' stacking labels for routing packets to the N' label-switched nodes, via the mobile border node and the primary border node. Preferably, after receiving the notify message, said at least part of the M' mobile label-switched nodes uses said intra-mobile-domain labels stacked with said N' stacking labels for routing packets to the N' label-switched nodes, via the mobile border node and the primary border node.

Advantageously, at the receipt of the request message, the primary border node updates a respective forwarding information storage area with said M' labels (as received in the request message from the mobile border node). This enables to form label switched paths from the primary border node to M' of the M mobile label-switched nodes, via the mobile border node.

Advantageously, after the receipt of the request message, the primary border node uses said M' labels to respectively route packets (via label switching, for example, according to MPLS) to the M' mobile label-switched nodes, via the mobile border node.

Advantageously, at the receipt of the response message, the mobile border node updates a respective forwarding information storage area with said N' labels (as received in the response message from the primary border node). This enables to form label switched paths from the mobile border node to N' of the N mobile label-switched nodes, via the primary border node.

Advantageously, after receipt of the response message, the mobile border node uses the N' labels to respectively route packets (via label switching, for example, according to MPLS) to the N' label-switched nodes, via the primary border node.

Suitably, the mobile domain further comprises one or more client devices. Advantageously, the plurality of client devices is connected to the M mobile label-switched nodes, for example through a local area network internal to the mobile domain. The local area network can be wired and/or wireless.

The plurality of client devices of the mobile domain is connected to the M mobile label-switched nodes that—in their turn—are connected to the primary domain via the mobile border node and the primary border node. Advantageously, client devices of the mobile domain are not enabled to directly route packets to the primary domain without the intermediation of the M mobile label-switched nodes, the mobile border node and the primary border node.

In particular, each client device is served (directly or indirectly) by a respective one of the M label-switched nodes and remains reachable within the network behind the same respective label-switched node, irrespectively of any network reconfiguration due to mobility.

Suitably, the primary domain further comprises one or more client devices. Advantageously, the plurality of client devices is connected to the N label-switched nodes, for example through a local area network (hereinafter, also referred to as network backbone) internal to the primary domain. The network backbone can be wired and/or wireless.

The plurality of client devices of the primary domain is connected to the N label-switched nodes that—in their turn—are connected to the mobile domain via the primary border node and the mobile border node. Advantageously, client devices of the primary domain are not enabled to directly route packets to the mobile domain without the intermediation of the N label-switched nodes, the primary border node and the mobile border node.

In particular, each client device is served (directly or indirectly) by a respective one of the N label-switched nodes and remains reachable within the network behind the same respective label-switched node, irrespectively of any network reconfiguration due to mobility.

Suitably, the label-switched network further comprises a wireless communication network providing a wireless channel via which the N label-switched nodes of the primary domain can communicate to the M mobile label-switched nodes of the mobile domain.

The primary border node and the mobile border node are respectively selected among the N label-switched nodes and the M mobile label-switched nodes (when M>1) in order to guarantee a predetermined degree of connection quality between the primary domain and the mobile domain. The degree of connection quality can, for example, be measured in terms of signal strength. The predetermined degree can, for example, be evaluated by using a predetermined threshold. When the primary border node and the mobile border node do not guarantee anymore the predetermined degree of connection quality, a new couple of primary border node and mobile border node is selected, that guarantees the predetermined degree of connection quality. In addition, said handoff procedure is executed by the new couple of primary border node and mobile border node in order to establish a connection between the primary domain and the mobile domain via said new couple. When M=1, the mobile border node remains the same, only the primary border node changes.

The first time a handoff procedure is executed in order to establish a label switched connection between the primary domain and the mobile domain, label-switched paths between the N' label-switched nodes and the M' mobile label-switched nodes, via the primary border node and the mobile border node, are advantageously created.

Then, at each subsequent execution of the handoff procedure, the label-switched paths between the N' label-switched nodes and the M' mobile label-switched nodes are advantageously modified in order to provide connection via the new selected couple of primary border node and mobile border node.

The label switched network can comprise one or more mobile domains, movable with respect to the primary domain. Each mobile domain will comprise M mobile label-switched nodes, with M≥1 (M being equal or different for the various mobile domains), and, preferably, at least one client device. When, the label switched network comprises a plurality of mobile domains, a distinct couple of primary border node and mobile border node is selected for each mobile domain and the handoff procedure is executed by each distinct couple of primary border node and mobile border node, independently.

According to an embodiment, the label-switched network is configured to support an IP network.

According to a preferred embodiment, the label-switched network is a MPLS network.

According to an embodiment, the label-switched network is a WMN network. The WMN can be in part wireless and in part wired.

According to an embodiment, the mobile domain is a vehicle. The vehicle can be, for example, a train, a boat, a bus or a car.

BRIEF DESCRIPTION OF THE SEVERAL VIEWS OF THE DRAWINGS

Further characteristics and advantages of the present invention will become clearer from the following detailed description of some preferred embodiments thereof, made as an example and not for limiting purposes with reference to the attached drawings. In such drawings.

DETAILED DESCRIPTION OF THE INVENTION

Figure 1A:
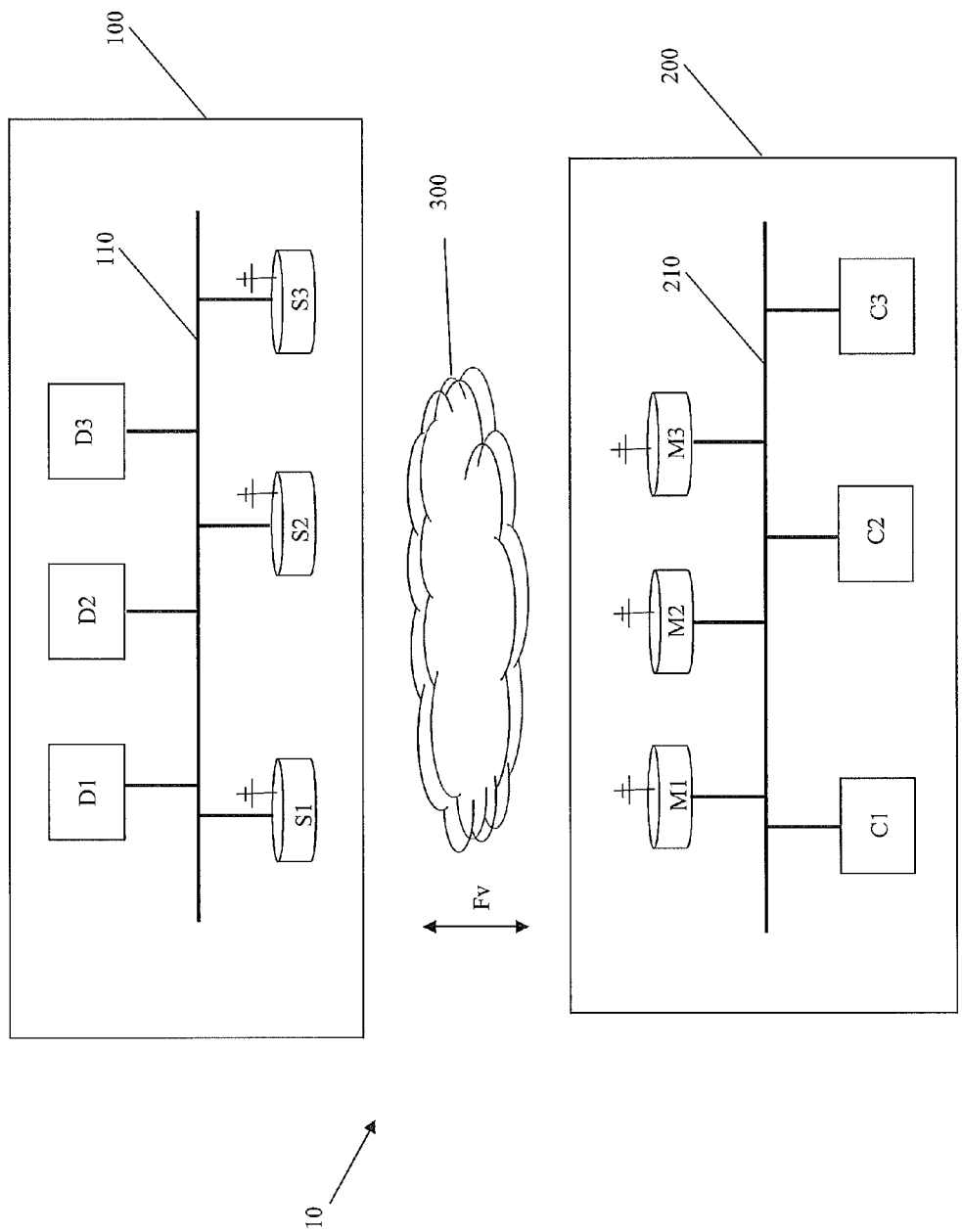
FIG. 1a shows a label switched network 10 according to an embodiment of the invention.

FIG. 1a shows a label switched network 10 according to an embodiment of the invention comprising a primary domain 100, a mobile domain 200 and a wireless communication network 300.

The primary domain 100 comprises N label-switched nodes (in FIG. 1, N=3) S1, S2, S3.

The N label-switched nodes S1, S2, S3 can be connected to each other either via wired or wireless links (or any combination of them) by means of suitable wireless/wired interfaces.

The primary domain 100 comprises a wired and/or wireless network backbone 110 providing connectivity inside the primary domain 100.

The topology of the network backbone 110 can be arbitrary and it may contain heterogeneous segments implemented using any suitable communication technology. Examples of such technologies are: Ethernet, optical fiber, layer-2 VPNs (Virtual Private Networks) over broadband xDSL (Digital Subscriber Line), wireless technologies such as IEEE 802.11, WiMax, cellular, and similar.

In the example of FIG. 1a the network backbone 110 is wired and the N label-switched nodes S1, S2, S3 are connected to each other via wired links.

Figure 1B:
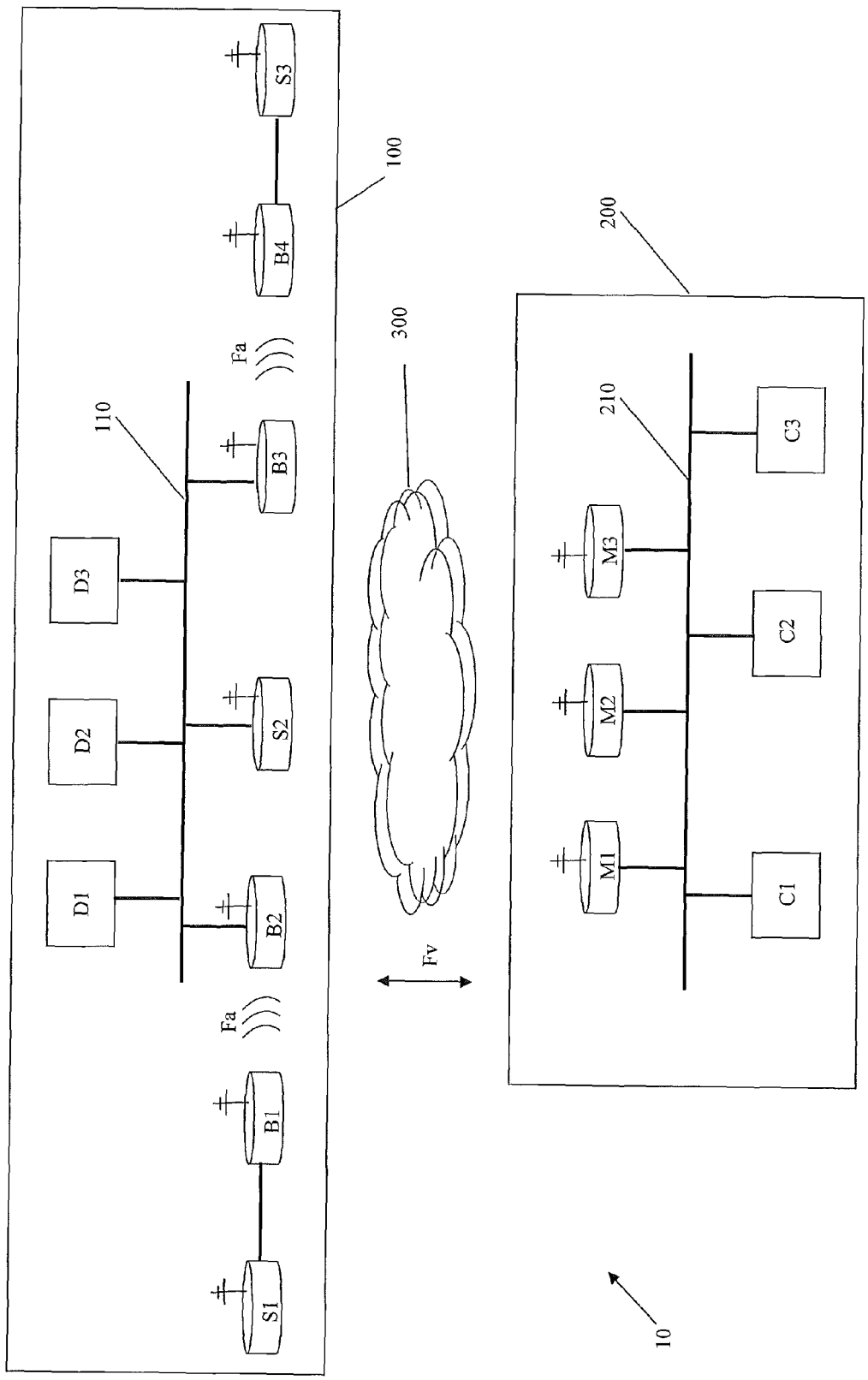
FIG. 1b shows a label switched network 10 according to another embodiment of the invention.

FIG. 1b shows an embodiment of the label switched network 10 which is similar to that of FIG. 1a except for the fact that the primary domain 100, besides N label-switched nodes S1, S2, S3, also comprises one or more devices (in the example, four devices B1, B2, B3, B4) adapted to provide wireless links (in the example over a wireless radio channel Fa), when wired links between label-switched nodes $S_1$, $S_2$, $S_3$ are not feasible for any reason. Devices B1, B2, B3, B4 can be label-switched nodes configured to implement the method of mobility management of the invention or client devices (for example commercial Wi-Fi routers) not configured to implement the method of mobility management of the invention and merely adapted to provide said wireless links.

At least part of the N label-switched nodes S1, S2, S3, has at least one wireless interface with a radio configured to a wireless channel Fv. The wireless channel Fv enables said at least part of the N label-switched nodes S1, S2, S3 to radio communicate with the mobile domain 200 through the wireless communication network 300.

The wireless communication network 300 provides the wireless channel Fv. The wireless communication network 300 can be implemented, for example, by using IEEE 802.11 technology.

The primary domain 100 comprises also a plurality of client devices D1, D2, D3 that can be connected to the network backbone 110 either directly or through wireless access points (not shown). At least one of said client devices D1, D2, D3 could be connected to the public internet to provide public connectivity to the whole label switched network 10.

The mobile domain 200 comprises M mobile label-switched nodes (in FIG. 1, M=3) M1, M2, M3.

At least part of the M mobile label-switched nodes M1, M2, M3, has at least one wireless interface with a radio configured to the wireless channel Fv.

The mobile domain 200 comprises a LAN (local area network) 210 providing connectivity inside the mobile domain 200. Preferably, the LAN 210 is implemented by using Ethernet technology. However, other technologies may be used as, for example, optical fiber, layer-2 VPNs over broadband xDSL, wireless technologies such as IEEE 802.11, WiMax, cellular, and similar.

The LAN 210 can be wired (as exemplarily shown in FIGS. 1a, 1b) and/or wireless. Even if not shown, a similar solution with devices B1, B2, B3, B4, as shown in FIG. 1b for the primary domain 100, can be provided for the mobile domain 200.

The mobile domain 200 comprises also a plurality of client devices C1, C2, C3 that can be connected to the LAN 210 either directly or through a wireless access point (not shown).

The mobile domain 200 can be a vehicle as, for example, a (ferry)boat, a train, a bus, a car or similar vehicle.

The primary domain 100 can be installed on a railway line, coastwise, on a road line and similar.

The client devices C1, C2, C3, D1, D2, D3 can be, for example, video cameras, laptop, PC, mobile phones, PDAs, and similar.

The wireless access point(s) (not shown) can be, for example, a wireless modem/router, a PC, a mobile phone, a laptop or a similar device providing wireless access point functionality.

In an embodiment, the label-switched nodes S1, S2, S3, M1, M2, M3 are label-switched routers. When the label-switched network 10 is a WMN, the label-switched nodes S1, S2, S3, M1, M2, M3 are mesh routers.

Packet routing among the N label-switched nodes S1, S2, S3 and the M mobile label-switched nodes M1, M2, M3 is performed through label switching. In a preferred embodiment MPLS technology is used to deliver IP-encapsulated data.

As stated above, MPLS relies on label identifiers, rather than the network destination (IP) address as in traditional IP routing, to determine the sequence of nodes to be traversed to reach the end of a path. A sequence of label-switched nodes configured to deliver packets from an ingress node to an egress node using label switching is denoted as a Label Switched Path (LSP) or "tunnel". The ingress node classifies incoming packet according to a set of Forwarding Equivalence Classes (FECs); when a packet matches a class, it is marked with a label associated with the particular class and then forwarded to the next-hop node of the LSP, according to the information configured into the Forwarding Information Base (FIB) table of the ingress node. Subsequently, each intermediate node manipulates the label(s) stored into the packet and then forwards the packet to the next-hop node, according to the information configured into the Forwarding Information Table (FIB) of the intermediate node. The egress node finally removes the label and handles the packet using IP routing functions.

Within the primary domain 100 the N label-switched nodes S1, S2, S3 install intra-primary-domain label-switched paths amongst themselves to ensure full connectivity across the primary domain 100. Intra-primary-domain labels are suitably configured into the FIBs of the N label-switched nodes S1, S2, S3.

Within the mobile domain 200 the M mobile label-switched nodes M1, M2, M3 install intra-mobile-domain label-switched paths amongst themselves to ensure full connectivity across the mobile domain 200. Intra-mobile-domain labels are suitably configured into the FIBs of the M mobile label-switched nodes M1, M2, M3.

The MPLS signaling which constructs said intra-primary-domain/intra-mobile-domain label-switched paths is carried out by an underlying IP routing service, according to techniques known in the art.

No predefined label-switched paths are initially installed between the M mobile label-switched nodes M1, M2, M3 of the mobile domain 200 and the N label-switched nodes S1, S2, S3 of the primary domain 100.

According to the invention, packets routing between the primary domain 100 and the mobile domain 200 is performed with the intermediation of a primary border node $S_B$, suitably selected from the N label-switched nodes S1, S2, S3, and of a mobile border node $M_B$, suitably selected from the M mobile label-switched nodes M1, M2, M3.

When the topology of the label-switched network 10 changes for any reason or when the mobile domain 200 enters for the first time the communication range of the primary domain 100 within the communication network 300, the FIBs of the label-switched nodes involved in the change are suitably reconfigured in order to adapt to the new network topology.

In a mobility scenario, wherein there is a relative motion of the mobile domain 200 with respect to the primary domain 100, the FIBs reconfiguration should be performed any time, for any reason, a link between a current primary border node $S_B$ and a current mobile border node $M_B$ is not any more feasible and a new link between a new primary border node $S_{B'}$ and a new mobile border node $M_{B'}$ has to be created.

The M mobile label-switched nodes M1, M2, M3 of the mobile domain 200 and the N label-switched nodes S1, S2, S3 of the primary domain 100 advantageously comprise hardware and/or software and/or firmware modules configured so as to carry out the mobility management method according to the invention.

In an embodiment of the invention, the mobile border node $M_B$ and the primary border node $S_B$ are dynamically selected among the M mobile label-switched nodes M1, M2, M3 and the N label-switched nodes S1, S2, S3 in a continuous process. The M mobile label-switched nodes M1, M2, M3, which operate on the said wireless channel Fv, continuously monitor the quality of the wireless signals received from each node S1, S2, S3 of the primary domain 100 which also operates on the said wireless channel Fv. Said mobile label-switched nodes also periodically send (e.g. every 100 ms) to a specific node, designed among M1, M2, M3 to act as a mobile domain master node $M_M$, a message containing the signal statistics collected in the last time span. The master node $M_M$ collects and merges the messages received from said mobile label-switched nodes and, optionally, also data from its own measurements, and it processes the aggregated data to determine a couple of nodes ($M_B$, $S_B$) which provides at any given time an optimal connection quality (e.g., in term of signal strength P) between the mobile domain 200 and the primary domain 100.

In an embodiment, the master node $M_M$ aggregates the various data ($S_i$, $M_j$, P) received from said mobile label-switched nodes and, at given intervals, runs a handoff decision algorithm (HDA). The HDA can be executed by a "layer-2" handoff module running on the master node $M_M$ and may comprise the following steps:

1. retrieving the current mobile border node $M_B$, the current primary border node $S_B$ and the current signal strength P* associated with the couple $M_B$-$S_B$, as reported by $M_B$;
2. scanning the current aggregated data ($S_i$, $M_j$, P) received from the mobile label-switched nodes M1, M2, M3 looking for tuples ($S_{B'}$, $M_{B'}$, P') where P'≥P*+D, where D is a configurable threshold;
3. amongst all entries satisfying the condition P'≥P*+D, if any, selecting the tuple ($S_{B'}$, $M_{B'}$, P') having the highest value of the signal strength P'.
4. if at least one tuple is found at step 3), broadcasting a notification message to the mobile label-switched nodes M1, M2, M3 to inform them that $M_{B'}$ is the new mobile border node.

When ($M_B$, $S_B$) changes, e.g. into ($M_{B'}$, $S_{B'}$), the new mobile border node $M_{B'}$ receives the notification message from the master node $M_M$, recognizes itself as the newly elected mobile border node, and runs a handoff procedure according to the invention for establishing a label switched connection between the new primary border node $S_{B'}$ and the new mobile border node $M_{B'}$. The new mobile border node $M_{B'}$ initiates the handoff procedure by sending an appropriate message to a "layer 3" handoff module running on the new mobile border node $M_{B'}$ itself.

In a preferred embodiment of the invention, said appropriate message comprises the following parameters: S_IP (optional, which is the IP address of the primary border router $S_{B'}$), S_MAC (that is the MAC (Medium Access Control) address of the wireless radio interface of the primary border router $S_{B'}$), SEQ_NUM (that is, a sequence number associated with the invoked handoff procedure).

The handoff procedure comprises three main phases: 1) a handoff request phase performed by the mobile border node $M_{B'}$; 2) a handoff response phase performed by the primary border node $S_{B'}$; and 3) a handoff notification phase, performed independently both by $M_{B'}$ and $S_{B'}$.

Figure 2:
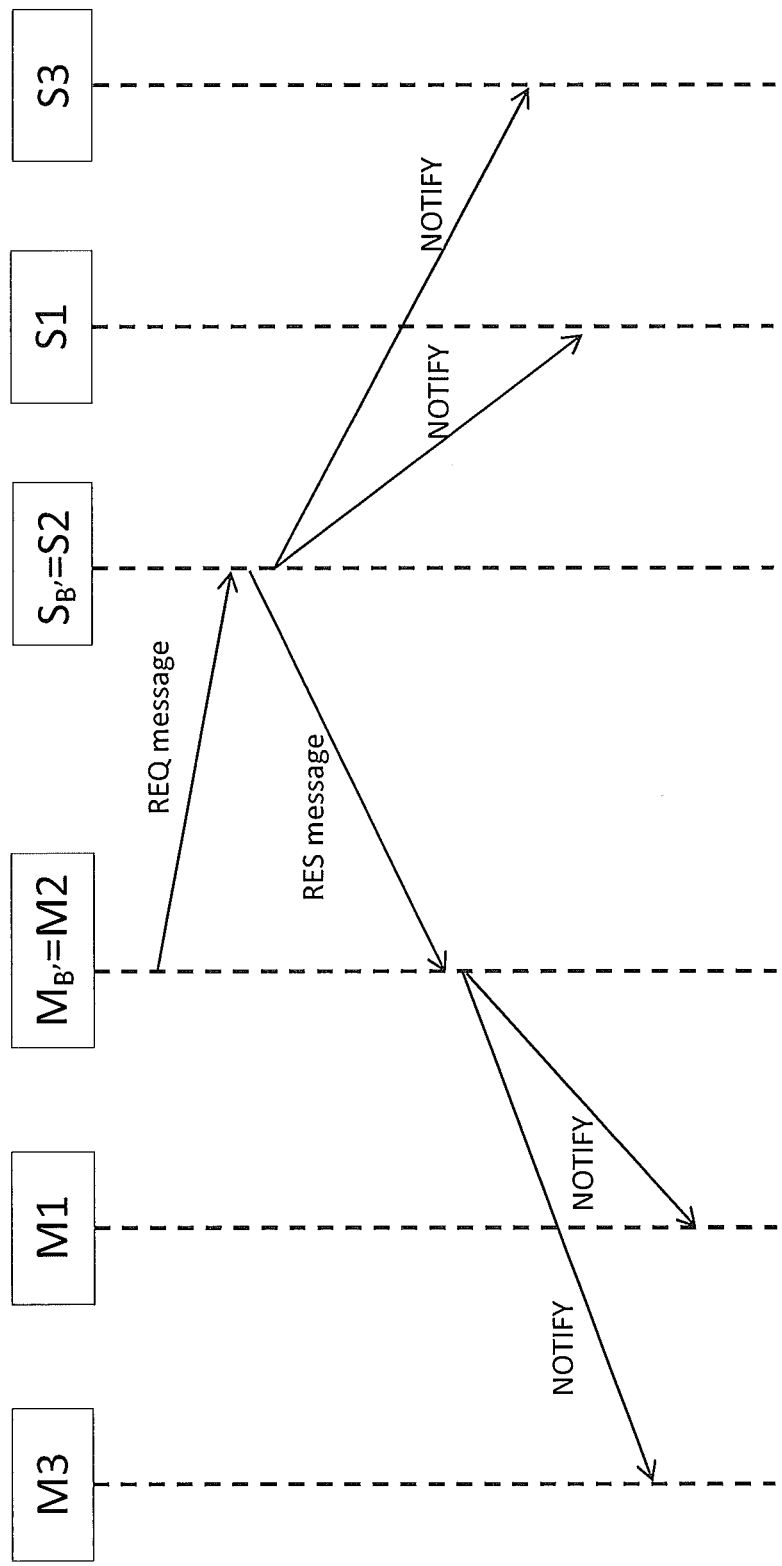
FIG. 2 shows a flow of messages exchanged during a handoff procedure according to an embodiment of the invention.

The flow of messages exchanged during the three phases is illustrated schematically by the diagram of FIG. 2.

In the example of FIG. 2, $S_{B'}$ corresponds to S2 and $M_{B'}$ corresponds to M2.

The handoff request phase comprises the transmission of a signaling REQ (request) message from the mobile border node $M_{B'}$ to the primary border node $S_{B'}$. Such REQ message is preferably sent over the wireless channel Fv directly to the layer-2 MAC address of the primary border node $S_{B'}$ (as received by the mobile border node $M_{B'}$ from the master node $M_M$ as S_MAC parameter), since it is assumed that, due to service disruption caused by mobility, the standard IP routing layer can be unable to deliver data during the handoff transitory.

The REQ message preferably comprises the following information: $M_{B'}$_MAC; MD_ID; SEQ_NUM; MDL_LIST; and, optionally, PDN_LIST.

$M_{B'}$_MAC is the MAC address of the wireless radio interface of the mobile border node $M_{B'}$.

MD_ID (Mobile Domain IDentifier) is a unique identifier, which can be an integer number assigned (for example by the network administrator) to the mobile domain 200 (it has the same value for all the M mobile label-switched nodes M1, M2, M3 of the mobile domain 200). This identifier can be particularly useful when the label-switched network 10 comprises more than one mobile domain 200.

SEQ_NUM is the sequence number as received from the master node $M_M$ as SEQ_NUM parameter.

MDL_LIST (Mobile Domain Label List) comprises M' labels to be used by the primary border node $S_{B'}$ to respectively route packets, via the mobile border node $M_{B'}$, to M' of the M mobile label-switched nodes, with M' integer, $1 \leq M' \leq M$. In the example, M'=M=3.

PDN_LIST (Primary Domain Node List)) is a list of identifiers (e.g. IP or MAC addresses) of at least part of the N label-switched nodes S1, S2, S3 of the primary domain 100. This list can be used by the mobile border node $M_{B'}$ to indicate, to the primary border router $S_{B'}$, N' specific label-switched nodes of the primary domain 100 (with N' integer, $1 < N' \leq N$) that should be reachable from label-switched nodes M1, M2, M3 and client devices C1, C2, C3 of the mobile domain 200.

When the primary border node $S_{B'}$ receives the REQ message sent by the mobile border node $M_{B'}$, it performs the handoff response phase, preferably according to the following actions:

1) It checks the validity of the received handoff sequence number SEQ_NUM for the particular mobile domain 200 (identified by MD_ID). If the message is found to be old or a duplicate, it is discarded. This check and the use of the SEQ_NUM parameter can be useful for discarding old or duplicate handoff request messages.
2) It sends a signaling RES (response) message to the mobile border node $M_{B'}$. Similarly as above, this message is preferably sent directly to the layer-2 MAC address of the mobile border node $M_{B'}$ over the wireless link. The RES message preferably comprises the following information: SEQ_NUM (that is, the sequence number as received in the REQ message) and PDL_LIST. The PDL_LIST (Primary Domain Label List) parameter comprises N' labels to be used by the mobile border node $M_{B'}$ to respectively route packets, via the primary border node $S_{B'}$, to N' of the N mobile label-switched nodes, with N' integer, $1 < M' \leq M$. The value of N' can be defined depending on administrative policy defined, for example, by the network administrator. If a non-empty PDN_LIST parameter was specified in the received REQ message, the N' nodes can be selected on the basis of the content of the PDN_LIST parameter. In the example, N'=N=3. Optionally, the RES message may also comprise the following information: $S_{B'}$_MAC (the MAC address of the wireless radio interface of the primary border node $S_{B'}$) and/or PD_ID (that is a unique identifier, which can be an integer number, assigned to the primary domain 200).
3) It uses the M' labels received in the MDL_LIST parameter of the REQ message for configuring/updating its FIB tables with appropriate entries. As explained in more detail below, such entries determine the installation of individual LSPs from the primary border router $S_p$ towards the M' mobile nodes.

Preferably, step 2) is performed before step 3) in order to avoid any delay in sending the RES message to the mobile border node $M_{B'}$.

When the mobile border node $M_{B'}$ receives the RES message from the primary border node $S_{B'}$, it performs the following actions:

1') It checks the validity of the received sequence number SEQ_NUM by matching it with the value transmitted into the REQ request. If the message is found to be old or a duplicate, it is discarded.
2') It uses the N' labels received in the PDL_LIST parameter of the RES message for configuring/updating its FIB tables with appropriate entries. As explained in more detail below, such entries determine the installation of individual LSPs from the mobile border router $M_{B'}$ towards the N' mobile nodes.

The handoff notification phase is executed by the primary border node $S_{B'}$ and the mobile border node $M_{B'}$ with the purpose of distributing handoff configuration data amongst the other N'/M' label switched nodes in the primary domain 100 and mobile domain 200, respectively, which do not directly participate in the handoff procedure between $S_{B'}$, and $M_{B'}$. Preferably, the primary border node $S_{B'}$ executes the handoff notification phase right after sending the RES message (that is, after action 2) and before action 3) above mentioned), while the mobile border node $M_{B'}$ preferably executes the handoff notification phase right after reception of the RES message received from $S_{B'}$ (that is, after action 1') and before action 2') above mentioned).

The handoff notification phase comprises the transmission of a NOTIFY message to the N'/M' label switched nodes (primary border node/mobile border node excluded). In the example of FIG. 2, the primary border node $S_{B'}$, sends a NOTIFY message to S1 and S3, and the mobile border node $M_{B'}$ sends a NOTIFY message to M1 and M3.

The NOTIFY message sent by the primary border node $S_{B'}$ advantageously comprises the following information: SEQ_NUM (that is, the sequence number as received in the REQ message) and PDSL_LIST. The PDSL_LIST (Primary Domain Stacking Label List) parameter comprises M' stacking labels allocated to the M' mobile label-switched nodes, which enable the notified label switched nodes of the primary domain 100 (in the example S1 and S3) to route packets, via the primary border node $S_{B'}$ (in the example, S2), to the M' mobile label-switched nodes (in the example, M1, M2 and M3).

The NOTIFY message sent by the mobile border node $M_{B'}$ advantageously comprises the following information: SEQ_NUM (that is, the sequence number as sent in the REQ message) and MDSL_LIST. The MDSL_LIST (Mobile Domain Stacking Label List) parameter comprises N' stacking labels allocated to the N' mobile label-switched nodes, which enable the notified mobile label switched nodes of the mobile domain 100 (in the example M1 and M3) to route packets, via the mobile border node $M_{B'}$ (in the example, M2), to the N' mobile label-switched nodes (in the example, S1, S2 and S3).

When a label-switched node (in the example, M1, M3, S1, S3) receives a NOTIFY message, it preferably performs the following actions:

1) It checks the validity of the received sequence number SEQ_NUM for the specific mobile domain 200 identified by MOB_ID. If the message is old or a duplicate, it is discarded.

2) It uses the N'/M' stacking labels received in the MDSL_LIST/PDSL_LIST parameter of the NOTIFY message for configuring/updating its FIB tables with appropriate entries. As explained in more detail below, such entries suitably determine the installation of individual LSPs from the N' label-switched nodes to the M' mobile label-switched nodes via the couple $S_{B'}$-$M_{B'}$ and, vice versa, from the M' mobile label-switched nodes to the N' label-switched nodes via the couple $M_{B'}$-$S_{B''}$. Such LSPs all include a link between $S_{B'}$ and $M_{B''}$, in both directions.

Packets to be sent through said LSPs are marked, for part of the LSP, using two stacked labels by means of label stacking.

Figure 3:
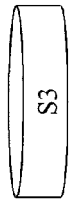
FIG. 3 shows an example of packet routing through a LSP installed according to the invention from label-switched node S1 to mobile label-switched node M1.
Figure 3:
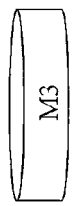
Figure 3:
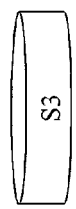
Figure 3:
Figure 3:
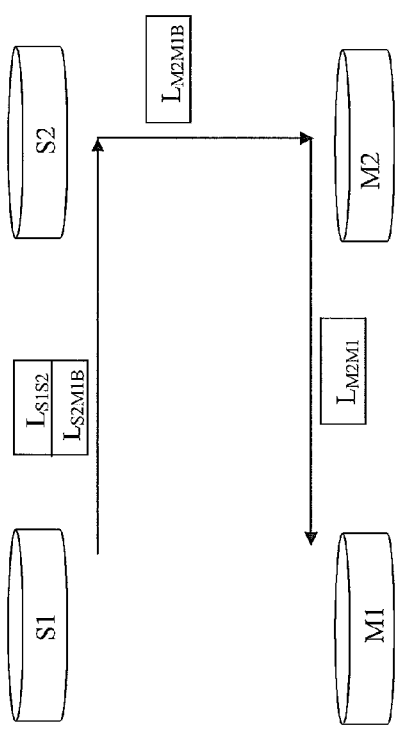

In particular, as schematically shown in FIG. 3, a packet to be sent through a LSP from a given label-switched node $S_i$ (e.g. S1) to a given mobile label-switched node $M_j$ (e.g. M1) is advantageously marked with an inner label (e.g. $L_{S2M1B}$) and an outer label (e.g. $L_{S1S2}$). The outer label will correspond to the intra-primary-domain label to be used by $S_i$ to route packets to $S_{B'}$ (e.g. S2) via a intra-primary-domain LSP in the primary domain 100. The inner label will correspond to the stacking label, received by $S_i$ in the NOTIFY message, enabling $S_i$ to route packets to $M_j$ via the link $S_{B'}$-$M_{B''}$. When, through the intra-primary-domain LSP, the packet reaches $S_{B''}$, the latter pops the outer label and swaps the inner label with the label (e.g. $L_{M2M1B}$) of the M' labels received in the REQ message that enables $S_{B'}$ to route the packet to $M_j$ via $M_{B''}$. When $M_{B'}$ receives the packet, it swaps the current label (e.g. $L_{M2M1B}$) with the intra-mobile-domain label (e.g. $L_{M2M1}$) enabling $M_{B'}$ to route packets to $M_j$ through a intra-mobile-domain LSP in the mobile domain 200.

Figure 4:
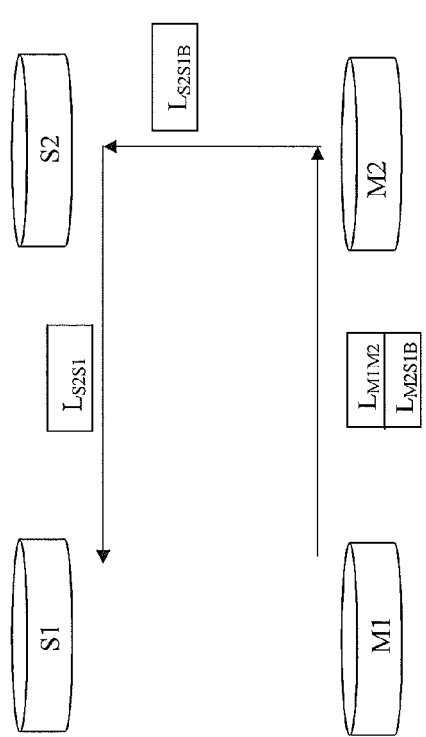
FIG. 4 shows an example of packet routing through a LSP installed according to the invention from mobile label-switched node M1 to label-switched node S1.

Similarly (as schematically shown in FIG. 4), a packet to be sent through a LSP from a given mobile label-switched node $M_h$ (e.g. M1) to a given primary label-switched node $S_k$ (e.g. S1) is advantageously marked with an inner label (e.g. $L_{M2S1B}$) and an outer label (e.g. $L_{M1M2}$) The outer label will correspond to the intra-mobile-domain label enabling $M_h$ to route packets to $M_{B'}$ via a intra-mobile-domain LSP within the mobile domain 200. The inner label will correspond to the stacking label, as received by $M_h$ in the NOTIFY message, to be used by $M_h$ to route packets to $S_k$ via the link $M_{B'}$-$S_{B''}$. When, through the intra-mobile-domain LSP, the packet reaches $M_{B''}$, the latter pops the outer label and swaps the inner label with the label (e.g. $L_{S2S1B}$) of the N' labels received in the RES message that enables $M_{B'}$ to route the packet to $S_k$ via $S_{B''}$. When $S_{B'}$ receives the packet, it swaps the current label (e.g. $L_{S2S1}$) with the intra-primary-domain label (e.g. $L_{S2S1}$) enabling $S_{B'}$ to route packets to $S_k$ through a intra-primary-domain LSP in the primary domain 100.

Figure 5:
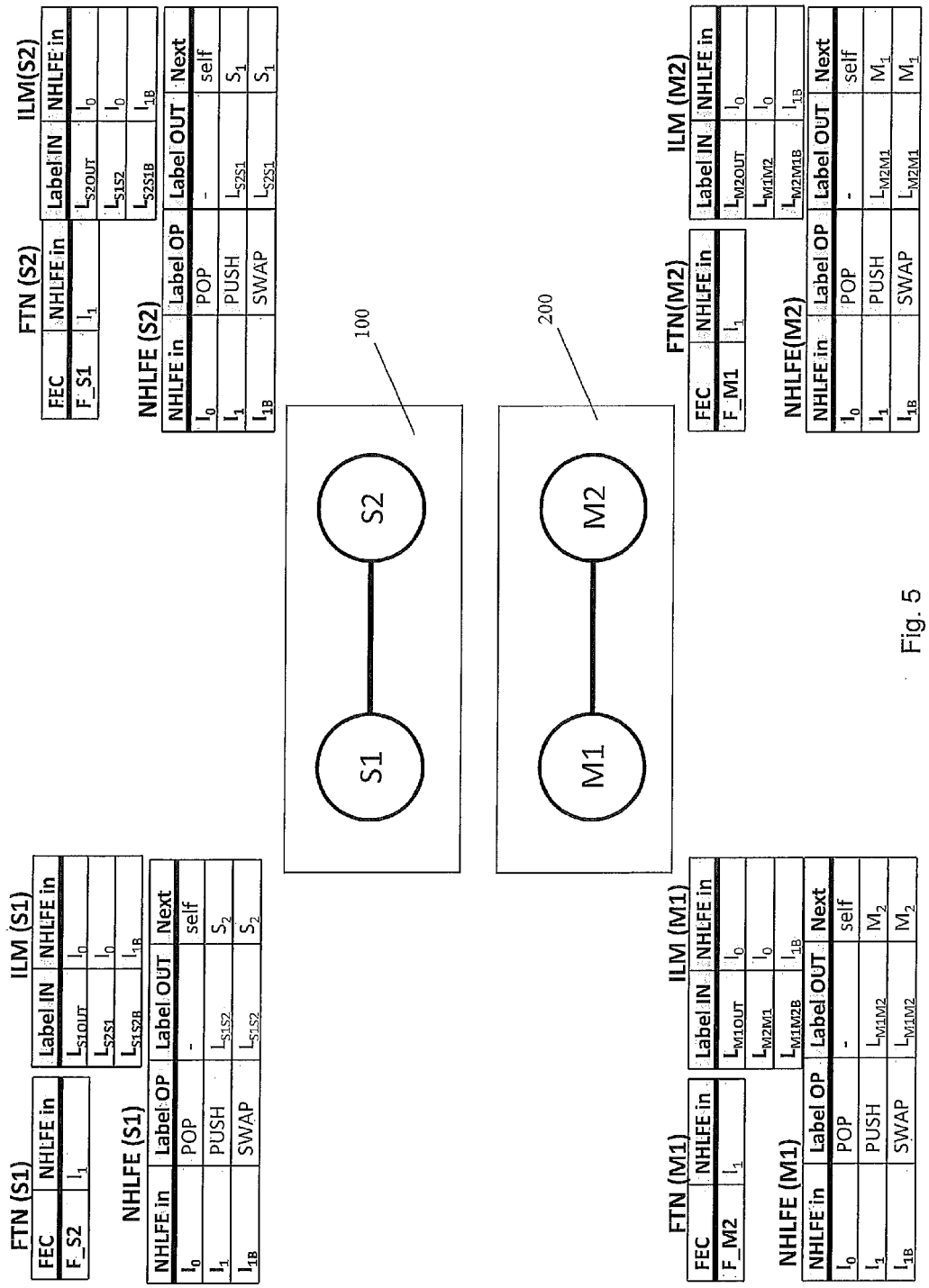
FIGS. 5 to 7 schematically show examples of FIB tables in the case of a primary domain comprising two label-switched nodes S1 and S2 and of a mobile domain comprising two label-switched nodes M1 and M2.
Figure 6:
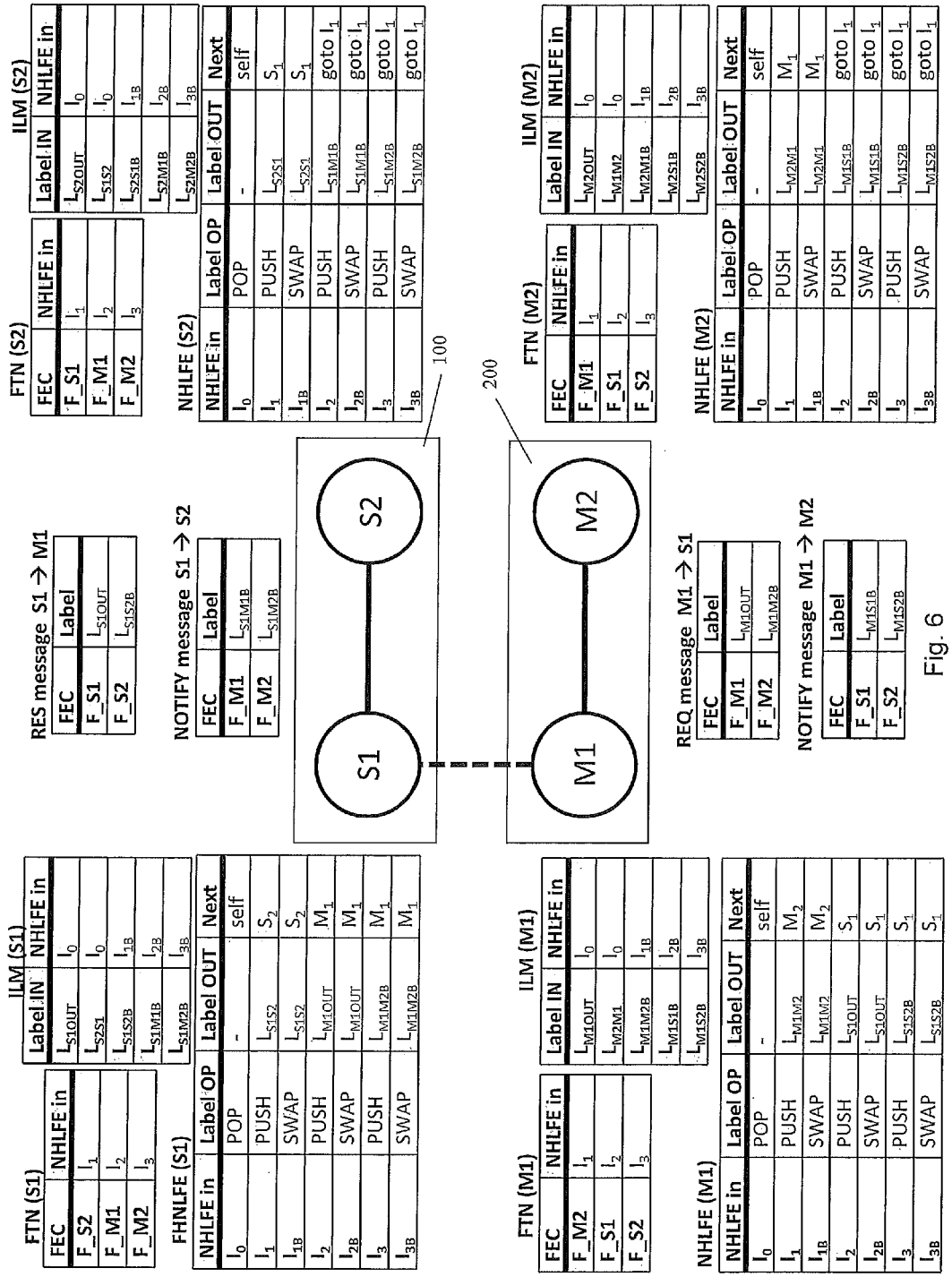
Figure 7:
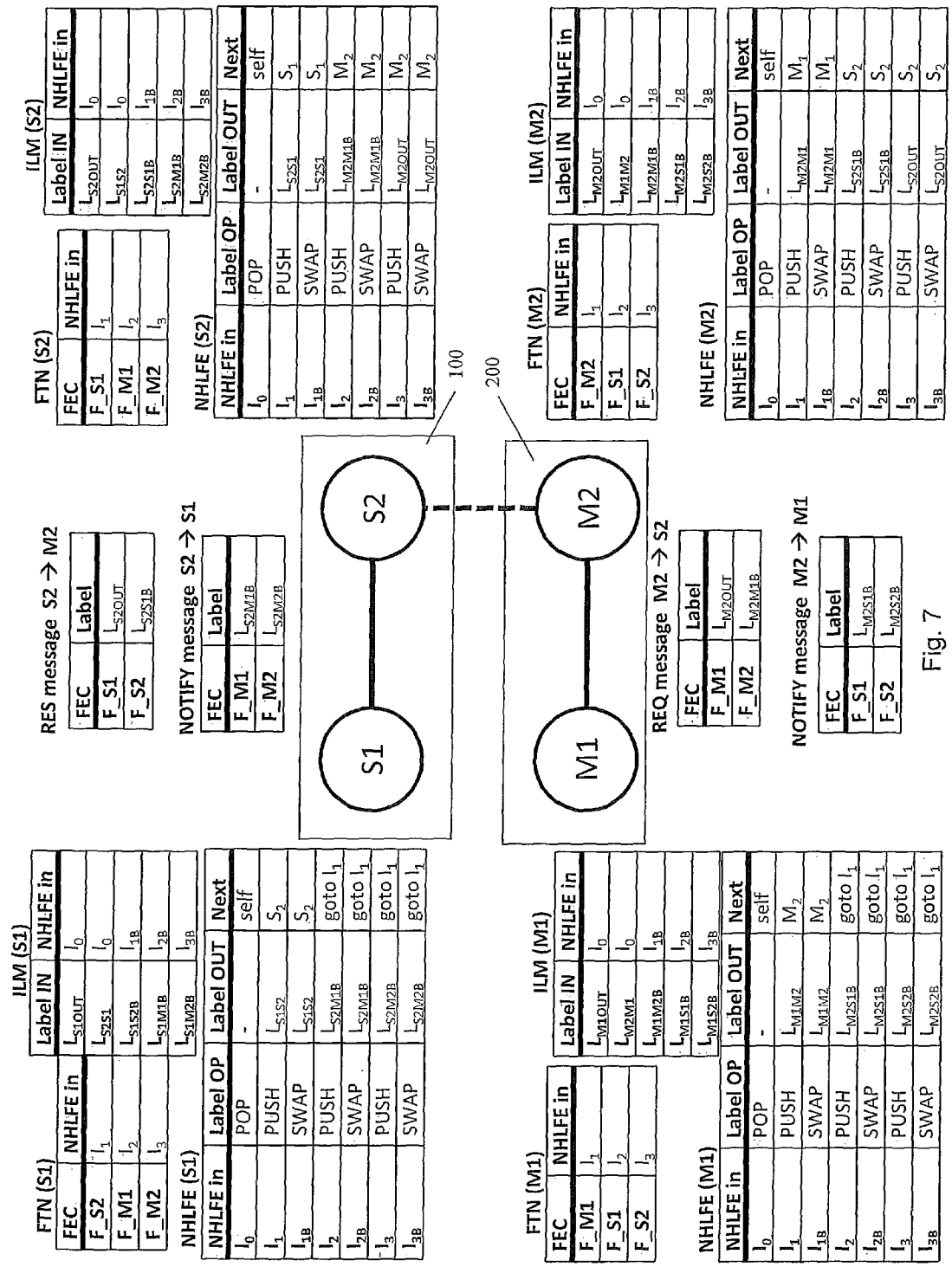

FIGS. 5 to 7 schematically show examples of FIB tables in the case of a primary domain 100 comprising two label-switched nodes S1 and S2 and of a mobile domain 200 comprising two label-switched nodes M1 and M2.

In each of S1, S2, M1, M2 the FIB tables comprise a FTN (FEC to NHLFE) table, a ILM (Incoming Label Mapping) table and a NHLFE (Next Hop Label Forwarding Entry) table.

The FTN tables provide correspondences between predetermined FECs and predetermined indexes (NHLFE in) to be used as access keys to the NHLFE table.

The ILM tables provide correspondences between predetermined input labels (LABEL IN) and predetermined indexes (NHLFE in) to be used as access key to the NHLFE table.

In correspondence of each index (NHLFE in), the NHLFE tables provide information about operation to be performed on input label (Label OP), about output label (Label OUT) and about the next-hop node for packet forwarding (Next).

FIG. 5 represents a situation wherein intra-primary-domain LSPs are pre-installed within the primary domain 100 (between S1 and S2) and intra-mobile-domain LSPs are pre-installed within the mobile domain 200 (between M1 and M2), with no initial connection between the primary domain 100 and the mobile domain 200.

In the example shown in FIG. 5, at the receipt of a packet with FEC=F_S2, S1 will access the NHLFE table with the index $I_1$, will PUSH (that is assign) label $L_{S1S2}$ to the packet and will send it to node S2.

At the receipt of a packet with input label $L_{S1OUT}$, S1 will access the NHLFE table with the index $I_0$ and will POP (that is remove) label $L_{S1OUT}$ from the packet and will pass the packet to upper layers of the network.

At the receipt of a packet with input label $L_{S2S1}$, S1 will access the NHLFE table with the index $I_0$ and will POP label $L_{S2S1}$ from the packet and will pass the packet to upper layers of the network.

At the receipt of a packet with input label $L_{S1S2B}$, S1 will access the NHLFE table with the index $I_{1B}$, will SWAP (that is change) the label $L_{S1S2B}$ into $L_{S1S2}$ and will send the packet to node S2.

Similar observations apply to S2, M1, M2.

FIG. 6 represents a development of the situation of FIG. 5 wherein a handoff procedure is executed between S1 and M1, so that LSPs are installed between the primary domain 100 and the mobile domain 200 via the primary/mobile border nodes S1 and M1.

As shown in FIG. 6, during the handoff procedure M' (with M'=M=2) labels (e.g. $L_{M1OUT}$, $L_{M1M2B}$) are sent from M1 to S1 in the REQ message, N' (with N'=2) labels (e.g. $L_{S1OUT}$, $L_{S1S2B}$) are sent from S1 to M1 in the RES message, M' stacking labels (e.g. $L_{S1M1B}$, $L_{M1S2B}$) are notified from S1 to S2 and N' stacking labels (e.g. $L_{M1S1B}$, $L_{M1S2B}$) are notified from M1 to M2.

As shown in FIG. 6, during the handoff procedure the FIB tables on S1, S2, M1, M2 are configured with new entries (two new rows in each of the FTN and ILM tables and four new rows in the NHLFE tables) adapted to install the new LSPs between the primary domain 100 and the mobile domain 200 via the primary/mobile border nodes S1 and M1.

In the embodiment of FIG. 6, during the handoff procedure the following new labels are allocated with respect to the situation of FIG. 5: the M' stacking labels ($L_{M1S1B}$, $L_{S1M2B}$) notified from S1 to S2 (see the last two new rows in the ILM table of S1) and the N' stacking labels (e.g. $L_{M1S1B}$, $L_{M1S2B}$) notified from M1 to M2 (see the last two new rows in the ILM table of M1). According to the preferred embodiment shown in FIG. 6, the following new labels are also allocated with respect to the situation of FIG. 5: further M' stacking labels (see $L_{S2M1B}$, $L_{S2M2B}$ in the last two new rows of the ILM table of S2) and further N' stacking labels (see $L_{M2S1B}$, $L_{M2S2B}$ in the last two new rows of the ILM table of M2). It is observed that these further labels $L_{S2M1B}$, $L_{S2M2B}$, $L_{M2S1B}$, $L_{M2S2B}$ are advantageously allocated in order to be ready to use them during a handoff procedure involving S2 and M2 as new primary/mobile border nodes (situation shown in FIG. 7). However, another embodiment of the invention (not shown) may provide that these further labels $L_{S2M1B}$, $L_{S2M2B}$, $L_{M2S1B}$, $L_{M2S2B}$ are allocated only when actually needed (that is only when S2 and M2 are actually elected as new primary/mobile border nodes).

In the preferred embodiment shown in FIG. 6, 2*M'*N' (that is, 2*2*2=8) new labels are globally allocated in the whole network with respect to the situation of FIG. 5.

In the example of FIG. 6, at the receipt of a packet with FEC=F_M2, S2 accesses the NHLFE table with the index $I_3$, pushes the inner label $L_{S1M2B}$ into the packet, accesses again the NHLFE table with the index $I_1$ (as indicated by the exemplary expression "goto$I_1$"), pushes the outer label $L_{S2S1}$ stacked onto $L_{S1M2B}$, into the packet and sends the packet to S1.

When S1 receives the packet, it accesses the NHLFE table with the index $I_0$, pops the outer label $L_{S2S1}$, accesses again the NHLFE table with the index $I_{3B}$, swaps the inner label $L_{S1M2B}$ with the label $L_{M1M2B}$ and sends the packet to M1.

When M1 receives the packet, it accesses the NHLFE table with the index $I_{1B}$, it swaps the label $L_{M1M2B}$ with the label $L_{M1M2}$ and sends the packet to M2.

When M2 receives the packet, it accesses the NHLFE table with the index $I_0$ and pops the label $L_{M1M2}$.

Similar observations apply for packet routing between any node of the primary domain 100 and any node of the mobile domain 200.

FIG. 7 represents a development of the situation of FIG. 6 wherein a handoff procedure is executed for connecting the primary domain 100 and the mobile domain 200 via a new couple of primary/mobile border nodes S2-M2. New LSPs are thus installed between the primary domain 100 and the mobile domain 200 via the new couple of primary/mobile border nodes S2-M2.

As shown in FIG. 7, during the handoff procedure M' (with M'=M=2) labels (e.g. $L_{M2OUT}$, $L_{M2M1B}$) are sent from M2 to S2 in the REQ message, N' (with N'=N=2) labels (e.g. $L_{S2OUT}$, $L_{S2S1B}$) are sent from S2 to M2 in the RES message, M' stacking labels (e.g. $L_{S2M1B}$, $L_{S2M2B}$) are notified from S2 to S1 and N' stacking labels (e.g. $L_{M2S1B}$, $L_{M2S2B}$) are notified from M2 to M2.

According to the preferred embodiment shown in FIGS. 6 and 7, once a first label switched connection is established between the primary domain 100 and the mobile domain 200 (situation shown in FIG. 6), at any subsequent handoff procedure (situation shown in FIG. 7), only the NHLFE tables on S1, S2, M1, M2 (and in particular only the rows of the NHLFE tables that relate to the connection between nodes of the two different domains 100, 200) have to be updated (see the tables of FIG. 7). The FTN and ILM tables need not to be updated and no new entry (that is row) is required in any table.

With reference to FIG. 7, it is observed that from S1 to M1 or M2, the outer label $L_{S1S2}$ is always the same and only the inner label varies, depending on the destination node (M1 or M2). Similarly, from M1 to S1 or S2, the outer label $L_{M1M2}$ is always the same and only the inner label varies, depending on the destination node (S1 or S2).

Indeed, as clearly visible in FIGS. 5 to 7, the mobility management method of the invention enables to exploit and to let unchanged the intra-primary-domain/intra-mobile-domain LSPs predefined within the primary domain 100 and within the mobile domain 200. Changes of the network topology due to the relative motion between the two domains 100 and 200 (that cause a handoff from a current couple of primary border node $S_B$ and mobile border node $M_B$ into a new couple $S_{B'}$-$M_{B'}$) are handled only by changing the rows of the NHLFE that relate to the connection between nodes of the two different domains 100, 200. Considering that connection between the primary domain 100 and the mobile domain 200 is established by means of only one node (the mobile border node $M_B/M_{B'}$) of the mobile domain 200 and only one node (the primary border node $S_B/S_{B'}$) of the primary domain 100, thanks to the invention a single handoff procedure, involving a single one-hop label-switched segment (between the mobile border node $M_B/M_{B'}$ and the primary border node $S_B/S_{B'}$), is sufficient to provide complete connectivity amongst the label-switched nodes and the client devices of both domains. The number of LSPs paths to be reconfigured at each handoff procedure is thus limited.

This significantly reduces the employment of node resources (e.g. memory usage, processing, number of FIB table entries and number of updating operations on FIB tables), limits the signaling and information spreading through the network and the bandwidth usage, improves the overall scalability of the system and contributes to provide very fast LSPs reconfiguration at each handoff procedure execution, reducing the chance to incur into transmission errors.

Reconfiguration of the network can be thus performed very quickly (e.g. with latency in the order of few milliseconds) without service disruption and loss of data packets.

As clear from the above description, according to the invention, packet communications between the primary border node $S_B/S_{B'}$ and the mobile border node $M_B/M_{B'}$ are established by means of label-switched paths. IP addresses of label-switched nodes and client devices of the mobile domain 200 need not to be notified to nodes of the primary domain 100. Label-switched nodes and client devices of the mobile domain 200 can thus maintain the same IP address during mobility, preserving data packets connections intact.

In particular, from the label-switched network perspective, client devices C1, C2, C3, D1, D2, D3 of both the mobile domain 200 and the primary domain 100 maintain their reachability binding (that is they continue to be reachable) behind a same label-switched node during the entire life time of the system. The reconfiguration effects induced by mobility are completely masked to all client devices C1, C2, C3, D1, D2, D3 by the NHLFE table modifications on label-switched nodes M1, M2, M3, S1, S2, S3. Indeed, said NHLFE table modifications effectively avoid any changes in layer-2 and layer-3 reachability information stored across the network about the client devices, as if the client devices were in fact mutually static.

In addition, the use of a label-switched connection between the primary border node $S_B/S_{B'}$ and the mobile border node $M_B/M_{B'}$ enables to simplify the reconfiguration of the network, without disrupting its service, by limiting the signaling and information spreading through the network, the bandwidth usage and the employment of node resources.

It is observed that even if only one mobile domain is shown in the figures, the invention applies also to label switched networks comprising more than one mobile domain 200, movable with respect to the primary domain 100.

When the label switched network 10 comprises a plurality of mobile domains 200, each comprising a plurality of M mobile switched nodes M1, M2, M3 (M being equal or different for the plurality of mobile domains 200), a distinct couple of primary border node (from the N label-switched nodes of the primary domain 100) and mobile border node (from the M mobile switched nodes of the mobile domain 200) is selected for each mobile domain 200 and the handoff procedure is executed, as explained in the above description, by each distinct couple of primary border node and mobile border node, independently and separately.

In an exemplary implementation of the invention, the primary domain 100 can be installed coastwise and the mobile domains 200 on ferryboats. Client devices D1, D2, D3 in the primary domain 100 can be PCs and/or digital video recording (DVR) units. Client devices C1, C2, C3 in each mobile domain 200 can be video cameras adapted to keep under surveillance the respective ferryboat and to send recorded images to one or more of client devices D1, D2, D3 in the primary domain 100. In each mobile domain 200, data packets from client devices C1, C2, C3 are sent to mobile label switched nodes M1, M2, M3 via the LAN 210. Then, data packets are sent from M1, M2, M3 to one label-switched node of S1, S2, S3 (the one which serves the relevant client device D1, D2, D3), via the current couple of mobile border node $M_B$ and primary border node $S_B$. Any time, due to the motion of a ferryboat with respect to the primary domain 100, the connection quality between the current mobile border node $M_B$ and primary border node $S_B$ is not anymore the preferred one, a new couple of mobile border node $M_{B'}$ and primary border node $S_{B'}$ is selected and a handoff procedure is executed as described in detail above.

In another exemplary implementation, the primary domain 100 can be a municipal video surveillance network and the mobile domains 200 can be police cars. Client devices D1, D2, D3 in the primary domain 100 can be video cameras installed in critical safety locations of the city and/or database information servers, while client devices C1, C2, C3 in the mobile domains 200 can be laptops and/or other communication systems used by police officials on the police cars to access said video cameras and the police department intranet or the public internet through said database information servers, while in motion.

The invention claimed is:

1. A method of mobility management in a label-switched network comprising the steps of:
    providing a primary domain comprising N label-switched nodes, with N>1, and a mobile domain comprising M mobile label-switched nodes, with M≥1, the mobile domain being movable with respect to said primary domain, packets routing between the primary domain and the mobile domain being performed by means of a primary border node, selected from the N label-switched nodes, and a mobile border node, selected from the M mobile label-switched nodes;
    at the mobile border node, sending a request message to the primary border node, the request message comprising M' labels adapted to enable the primary border node to form label switched paths from the primary border node to M' of the M mobile label-switched nodes, via the mobile border node, with M' being an integer, between 1 and M, inclusive;
    upon the receipt of said request message by primary border node, sending a response message to the mobile border node, the response message comprising N' labels adapted to enable the mobile border node to form label switched paths from the mobile border node to N' of the N label-switched nodes, via the primary border node, with N' being an integer, between 1 and N, inclusive; at the receipt of said request message, the primary border node also sending a notify message comprising M' stacking labels, allocated to the M' mobile label-switched nodes, to at least one of said N' label-switched nodes;
    wherein, when M>1, at the receipt of said response message, the mobile border node sending a notify message comprising N' stacking labels, allocated to said N' label-switched nodes, to at least one of the M' mobile label-switched nodes,
    whereby a handoff procedure is executed, establishing a label switched connection between the primary border node and the mobile border node.

2. The method according to claim 1, wherein intra-primary-domain labels are used for routing data packets between the N label-switched nodes of the primary domain through intra-primary-domain label-switched paths.

3. The method according to claim 1, wherein, when M>1, and intra-mobile-domain labels are used for routing data packets between the M mobile label-switched nodes of the mobile domain through intra-mobile-domain label-switched paths.

4. The method according to claim 1, wherein, after receiving the notify message, said at least part of said N' label-switched nodes uses said M' stacking labels for routing packets to the M' mobile label-switched nodes, via the primary border node and the mobile border node.

5. The method according to claim 2, wherein, after receiving the notify message, said at least part of said N' label-switched nodes uses said intra-primary-domain labels stacked with said M' stacking labels for routing packets to the M' mobile label-switched nodes, via the primary border node and the mobile border node.

6. The method according to claim 1, wherein, when M>1, after receiving the notify message, said at least part of the M' mobile label-switched nodes uses said N' stacking labels for routing packets to the N' label-switched nodes, via the mobile border node and the primary border node.

7. The method according to claim 3, wherein, when M>1, after receiving the notify message, said at least part of the M' mobile label-switched nodes uses said intra-mobile-domain labels stacked with said N' stacking labels for routing packets to the N' label-switched nodes, via the mobile border node and the primary border node.

8. The method according to claim 1, wherein, at the receipt of the request message, the primary border node updates a respective forwarding information storage area with said M' labels so as to form label switched paths from the primary border node to the M' mobile label-switched nodes, via the mobile border node.

9. The method according to claim 1, wherein, after the receipt of the request message, the primary border node uses said M' labels to respectively route packets to the M' mobile label-switched nodes, via the mobile border node.

10. The method according to claim 1, wherein, at the receipt of the response message, the mobile border node updates a respective forwarding information storage area with said N' labels so as to form label switched paths from the mobile border node to the N' mobile label-switched nodes, via the primary border node.

11. The method according to claim 1, wherein, after receipt of the response message, the mobile border node uses the N' labels to respectively route packets to the N' label-switched nodes, via the primary border node.

12. A method of mobility management in a label-switched network comprising the steps of:
    providing a primary domain comprising N label-switched nodes, with N>1, and a mobile domain comprising M mobile label-switched nodes, with M≥1, the mobile domain being movable with respect to said primary domain, packets routing between the primary domain and the mobile domain being performed by means of a primary border node, selected from the N label-switched nodes, and a mobile border node, selected from the M mobile label-switched nodes;

at the mobile border node, sending a request message to the primary border node, the request message comprising M' labels adapted to enable the primary border node to form label switched paths from the primary border node to M' of the M mobile label-switched nodes, via the mobile border node, with M' being an integer, between 1 and M, inclusive;

upon the receipt of said request message by primary border node, sending a response message to the mobile border node, the response message comprising N' labels adapted to enable the mobile border node to form label switched paths from the mobile border node to N' of the N label-switched nodes, via the primary border node, with N' being an integer, between 1 and N, inclusive; at the receipt of said request message, the primary border node also sending a notify message comprising M' stacking labels, allocated to the M' mobile label-switched nodes, to at least one of said N' label-switched nodes;

wherein, when M>1, at the receipt of said response message, the mobile border node sending a notify message comprising N' stacking labels, allocated to said N' label-switched nodes, to at least one of the M' mobile label-switched nodes, whereby a handoff procedure is executed, establishing a label switched connection between the primary border node and the mobile border node; and wherein the primary border node and the mobile border node are respectively selected among the N label-switched nodes and the M mobile label-switched nodes in order to guarantee a predetermined degree of connection quality between the primary domain and the mobile domain.

13. A method of mobility management in a label-switched network comprising the steps of:

providing a primary domain comprising N label-switched nodes, with N>1, and a mobile domain comprising M mobile label-switched nodes, with M≥1, the mobile domain being movable with respect to said primary domain, packets routing between the primary domain and the mobile domain being performed by means of a primary border node, selected from the N label-switched nodes, and a mobile border node, selected from the M mobile label-switched nodes;

at the mobile border node, sending a request message to the primary border node, the request message comprising M' labels adapted to enable the primary border node to form label switched paths from the primary border node to M' of the M mobile label-switched nodes, via the mobile border node, with M' being an integer, between 1 and M, inclusive;

upon the receipt of said request message by primary border node, sending a response message to the mobile border node, the response message comprising N' labels adapted to enable the mobile border node to form label switched paths from the mobile border node to N' of the N label-switched nodes, via the primary border node, with N' being an integer, between 1 and N, inclusive; at the receipt of said request message, the primary border node also sending a notify message comprising M' stacking labels, allocated to the M' mobile label-switched nodes, to at least one of said N' label-switched nodes;

wherein, when M>1, at the receipt of said response message, the mobile border node sending a notify message comprising N' stacking labels, allocated to said N' label-switched nodes, to at least one of the M' mobile label-switched nodes, whereby a handoff procedure is executed, establishing a label switched connection between the primary border node and the mobile border node; and wherein the mobile domain further comprises at least one client device connected to the M mobile label-switched nodes through a local area network internal to the mobile domain.

14. A method of mobility management in a label-switched network comprising the steps of:

providing a primary domain comprising N label-switched nodes, with N>1, and a mobile domain comprising M mobile label-switched nodes, with M≥1, the mobile domain being movable with respect to said primary domain, packets routing between the primary domain and the mobile domain being performed by means of a primary border node, selected from the N label-switched nodes, and a mobile border node, selected from the M mobile label-switched nodes;

at the mobile border node, sending a request message to the primary border node, the request message comprising M' labels adapted to enable the primary border node to form label switched paths from the primary border node to M' of the M mobile label-switched nodes, via the mobile border node, with M' being an integer, between 1 and M, inclusive;

upon the receipt of said request message by primary border node, sending a response message to the mobile border node, the response message comprising N' labels adapted to enable the mobile border node to form label switched paths from the mobile border node to N' of the N label-switched nodes, via the primary border node, with N' being an integer, between 1 and N, inclusive; at the receipt of said request message, the primary border node also sending a notify message comprising M' stacking labels, allocated to the M' mobile label-switched nodes, to at least one of said N' label-switched nodes;

wherein, when M>1, at the receipt of said response message, the mobile border node sending a notify message comprising N' stacking labels, allocated to said N' label-switched nodes, to at least one of the M' mobile label-switched nodes, whereby a handoff procedure is executed, establishing a label switched connection between the primary border node and the mobile border node; and wherein the primary domain further comprises at least one client device connected to the N label-switched nodes through a local area network internal to the primary domain.

15. The method according to claim 1, wherein M>1.

16. The method according to claim 15, wherein intra-mobile-domain labels are used for routing data packets between the M mobile label-switched nodes of the mobile domain through intra-mobile-domain label-switched paths.

17. The method according to claim 15, wherein after receiving the notify message, said at least part of the M' mobile label-switched nodes uses said N' stacking labels for routing packets to the N' label-switched nodes, via the mobile border node and the primary border node.

18. The method according to claim 15, wherein the M mobile label-switched nodes are jointly movable relative to the primary domain.

19. The method according to claim 12, wherein the primary border node and the mobile border node are dynamically selected from among the N label-switched nodes and the M mobile label-switched nodes, respectively.

* * * * *